US007822277B2

(12) United States Patent
Aleksic (10) Patent No.: US 7,822,277 B2
(45) Date of Patent: Oct. 26, 2010

(54) METHOD AND APPARATUS FOR COMMUNICATING COMPRESSED VIDEO INFORMATION

(75) Inventor: Milivoje Aleksic, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 1093 days.

(21) Appl. No.: 11/216,200

(22) Filed: Aug. 31, 2005

(65) Prior Publication Data

US 2007/0047659 A1 Mar. 1, 2007

(51) Int. Cl.
*G06K 9/36* (2006.01)
(52) U.S. Cl. ........................ 382/232; 382/233
(58) Field of Classification Search .......... 382/232–253
See application file for complete search history.

(56) References Cited

U.S. PATENT DOCUMENTS

| | | | |
|---|---|---|---|
| 4,716,460 A | 12/1987 | Benson et al. | |
| 5,764,298 A * | 6/1998 | Morrison | 348/500 |
| 6,118,818 A | 9/2000 | Min et al. | |
| 6,175,662 B1 | 1/2001 | Toda | |
| 6,611,358 B1 * | 8/2003 | Narayanaswamy | 358/442 |
| 7,016,547 B1 * | 3/2006 | Smirnov | 382/245 |
| 7,092,965 B2 * | 8/2006 | Easwar | 707/104.1 |
| 7,103,702 B2 | 9/2006 | Funamoto | |
| 7,113,302 B2 | 9/2006 | Reddy et al. | |
| 7,184,604 B2 | 2/2007 | Mizuno | |
| 7,196,802 B2 | 3/2007 | Tsuchiya | |
| 7,360,230 B1 * | 4/2008 | Paz et al. | 382/243 |
| 7,486,297 B2 | 2/2009 | Kouramanis et al. | |
| 2001/0047517 A1 * | 11/2001 | Christopoulos et al. | 725/87 |
| 2003/0206597 A1 * | 11/2003 | Kolarov et al. | 375/240.26 |
| 2005/0071876 A1 * | 3/2005 | van Beek | 725/62 |
| 2005/0102376 A1 * | 5/2005 | Ichikawa | 709/219 |

FOREIGN PATENT DOCUMENTS

| | | |
|---|---|---|
| EP | 0 507 270 | 10/1992 |
| EP | 0 530 761 | 3/1993 |
| EP | 0 655 723 | 5/1995 |
| WO | WO 2004/028142 A2 | 4/2004 |

(Continued)

OTHER PUBLICATIONS

Aleksic, M. et al.; Subsamping-Based Image Compression Prediction for Memory-Limited Applications; CCECE; May 2004; pp. 571-574.

(Continued)

*Primary Examiner*—Manav Seth
(74) *Attorney, Agent, or Firm*—Vedder Price P.C.

(57) ABSTRACT

A method and apparatus for communicating compressed video information includes storing video information compressed based on a first compression method, such as a method with a high compression ratio, and transcoding the compressed video information to produce corresponding recompressed video information that is based on a second compression method, with a lower compression ratio such as standard JPEG compression or other suitable compression. The method and apparatus, if desired, may include sending the recompressed video information for a destination apparatus which may then suitably decompress the video information using a standard decompression technique. For example, storing the compressed image in a high compressed format, for example, in a piecewise basis may be done online while the camera, for example, is in use so that the image is properly captured and then, transcoding the compressed image to a different level of compression while the camera is offline.

20 Claims, 8 Drawing Sheets

OTHER PUBLICATIONS

3rd Generation Partnership Project: 3GPP TS 26.140 V6.1.0; Multimedia Messaging Service (MMS); Media formats and codecs; Dec. 1, 2004; from www.3gpp.org.

European Patent Office International Search Report for International Application No. PCT/IB2006/002451, dated Apr. 25, 2007.

* cited by examiner

METHOD AND APPARATUS FOR COMMUNICATING COMPRESSED VIDEO INFORMATION

FIELD OF THE INVENTION

The invention relates generally to methods and apparatus for compressing and/or decompressing video information, and more particularly to methods and apparatus for communicating compressed video information for destination wireless apparatus.

BACKGROUND OF THE INVENTION

Cellular communication systems and other wireless communication systems are well known and allow, for example, various wireless apparatus such as, but not limited to, cell phones, email devices, laptop computers, personal digital assistants, handheld computers, internet appliances, and other suitable portable wireless devices to communicate with other devices and servers. There are strong trends in wireless connectivity in the deployment of digital cameras in cell phones and other devices. Typical cameras have increased resolution and the tendency is to expand the resolution up to 6 megapixels or more. High resolution images in digital still cameras or moving images is achieved by adding enough memory to store a complete frame or multiple frames of the full image. One or multiple images are then encoded into compressed formats including JPEG, JPEG 2000, or other popular standards. However, storing a full image inside the memory of a portable device, such as a handheld device, can require use of large processing resources and unnecessary increases in cost.

In addition, it would be desirable to allow wireless devices to support higher resolution images and/or also allow portable wireless devices that employ differing compression methods to be able to communicate the images from one wireless device to another, either directly or through a suitable network element such as base site controllers, base stations, or any other suitable network element, in any suitable network.

Accordingly, there exists a need that overcomes one or more of the above drawbacks.

BRIEF DESCRIPTION OF THE DRAWINGS

The invention will be more readily understood in view of the following description when accompanied by the below figures and wherein like reference numerals represent like elements.

DETAILED DESCRIPTION OF THE INVENTION

Briefly, a method and apparatus for communicating compressed video information includes storing video information compressed based on a first compression method, such as a method with a high compression ratio, and transcoding the compressed video information to produce corresponding recompressed video information that is based on a second compression method, with a lower compression ratio such as standard JPEG compression or other suitable compression. The method and apparatus, if desired, may include sending the recompressed video information for a destination apparatus which may then suitably decompress the video information using a standard decompression technique. As such, for example, storing the compressed image in a high compressed format, for example, in a piecewise basis or other basis may be done online while the camera is in use so that the image is properly captured and then, transcoding the compressed image to a different level of compression while the camera is offline.

In one example, the video information includes still image information from a camera, for example, in a cell phone, digital camera or other suitable handheld wireless apparatus and may include full motion video from such handheld wireless apparatus. In one example, after an image is stored with a high compression quality, in, for example, a source portable wireless apparatus, the compressed image is offline decoded on a piecewise basis, such as 16 lines at a time or any other suitable basis, to produce decompressed portions of video. After the frame is decoded on a piecewise basis, the video information is then processed such as by, for example, applying noise reduction or adding visual effects to the video information prior to recompressing of the modified video information using a different level of compression. For example, common effects may include adding bordering or digital zooming of the information, or any other desired effects.

Transcoding may be done, for example, in the portable wireless device, or can be executed on a server side (e.g. by a network element) under the control, for example, of a system operator or in any other suitable device. When employed in the network element, network element transcoding may enable compatibility for a network or wireless communication system to receive cell phone communications and video data (e.g., images) compressed in a proprietary high compression format, for example, and transcoding this information to a lower compression format, for example, such as a standard encoding format such as JPEG or JPEG 2000. The network element may then send the transcoded image out to a destination unit or units in an expected standard encoding format so that high end or high compression phones can communicate images to lower end phones or devices and lower end phones or devices need not employ additional hardware or software. Other advantages will be recognized by those of ordinary skill in the art.

In another embodiment, where transcoding is done, for example, in a network element, destination device decompression compatibility data is used to determine whether a destination unit has the decompression compatibility to decompress a particular frame or moving images and the network element may then suitably transcode a received image to produce a recompressed image in the format that can be handled by a particular destination unit.

In other embodiments since a higher compression ratio is used when initially compressing the image received, for example, from a camera or other video capture device, the buffer used to store the compressed image may be smaller, yet may still store an entire frame of video.

Figure 1:
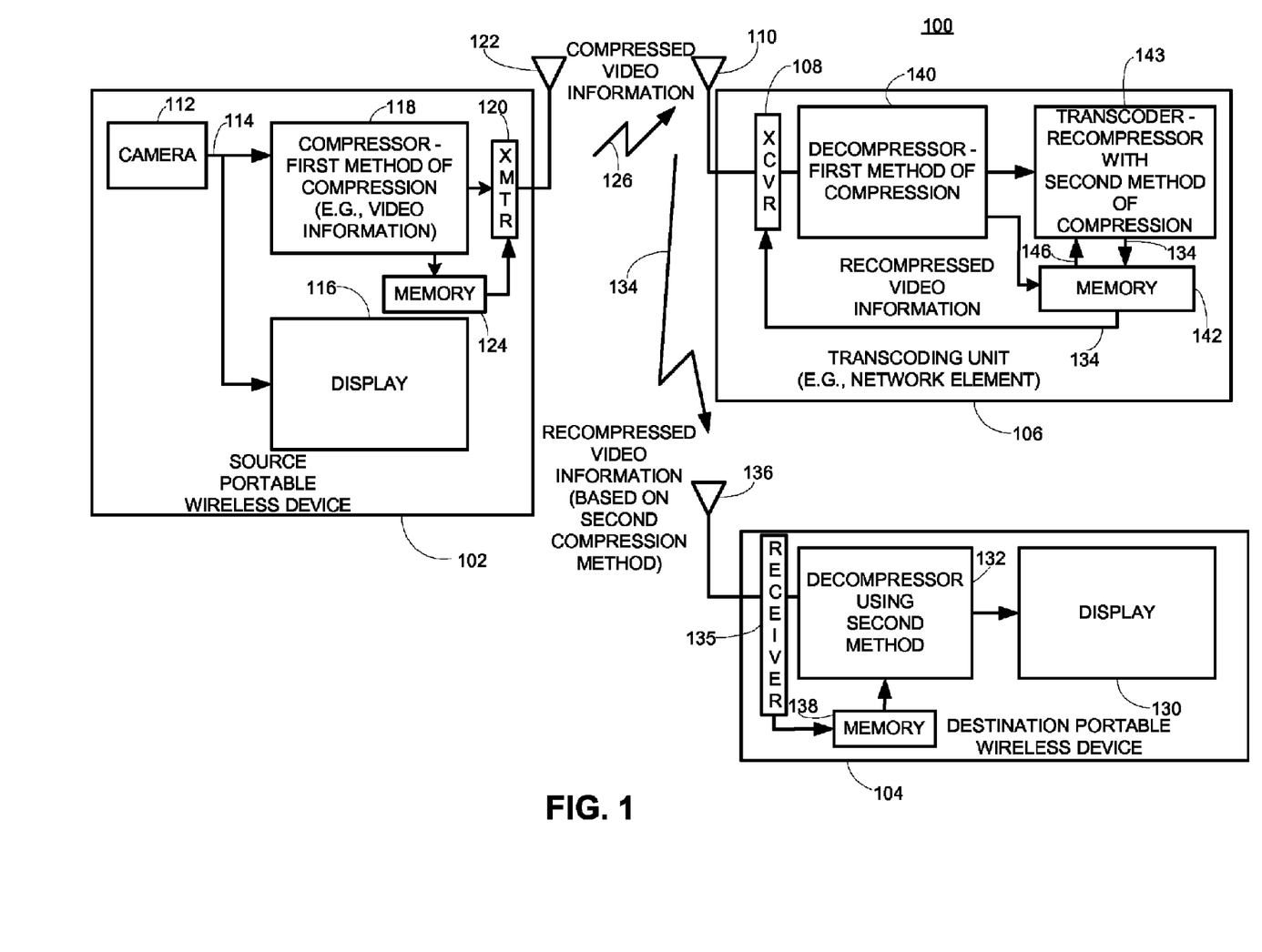
FIG. 1 is a block diagram illustrating one example of a system employing portable wireless apparatus for communicating compressed video information in accordance with one embodiment of the invention.

FIG. 1 is a block diagram illustrating one example of a communication system 100 that employs at least one source portable wireless device 102, at least one destination device shown in this example as a portable wireless device 104 and at least one transcoding unit 106, such as a network element. The portable wireless devices 102 and 104 may be any suitable portable wireless devices including, but not limited to, cell phones with video capture capabilities, such as cameras or moving image capture capabilities, cameras with other functionality, or other portable wireless devices, whether handheld or non-handheld devices that compress and/or decompress video information. The communication system 100 may be any suitable communication system and by way of example, for illustration purposes only, will be referred to as a cellular communication system that allows communication of voice and/or data to be communicated wirelessly. However, any suitable system may be employed.

The transcoding unit 106, as shown in this example is a wireless network element such as a base site controller, a base station, server in communication with a wireless transceiver or any other suitable network element that is operatively coupled to a wireless base station transceiver to provide information that is directly or indirectly wirelessly communicated to the portable wireless devices 102 and/or 104. In addition, the transcoding unit 104 may also be a web server or any other suitable element capable of performing the operations described herein. As shown, the transcoding unit 106 includes a wireless transceiver 108 operatively coupled to an antenna 110. This is shown as a logical connection as the transceiver 108 and antenna 110 may be co-located with the transcoding unit 106 or may be located in a different network element or any other suitable apparatus.

The source portable wireless device 102, in this example will be referred to as a cell phone with a camera 112 that provides captured video information 114 to a display 116. A compressor 118 is operative to use a first method of compression on the video information 114 and is also operatively coupled to a wireless transmitter 120, as known in the art which is also operatively coupled to an antenna 122 to wirelessly communicate information to and from the source portable wireless device 102. The transmitter 120 may also be, for example, a transceiver that also allows the reception of wireless information from the communication system 100 or any other suitable devices. The source portable wireless device 102 also includes memory 124 operatively coupled to the compressor 118 to receive and store video information compressed based on a first compression method used by the compressor 118. Memory 124 is then operatively coupled to the transmitter 120 through other circuitry, which may include processors and interfaces, as known in the art, to communicate compressed video information 126 that is wirelessly communicated for the transcoding unit 106.

Destination portable wireless device 104 is shown to include, for example, at least a display 130 and a decompressor 132 that is operative to decompress received recompressed video information 134 that was recompressed based on a second compression method that is different from the first compression method used by compressor 118. The destination portable wireless device also includes a receiver 135 which may also be a transceiver to also transmit, wirelessly, information within the communication system 100 for other wireless devices such as the source portable wireless device 102 or any other devices. The receiver 135 wirelessly receives, via antenna 136, the recompressed video information 134 and stores the recompressed video information in memory 138. Memory 138 is operatively coupled to the decompressor 132 so that the decompressor may access the memory 138 and decompress the recompressed video information for output to display 130 or for storage. Although not shown, the destination portable wireless device may also include compression capabilities and the source portable wireless device may also include decompression capabilities.

Transcoding unit 106 includes a decompressor 140 operative to decompress the received compressed video information 126 using the method of compression used by compressor 118 to produce decompressed video information that may be stored in memory 142. The transcoding unit 106 also includes a transcoder 143 that is operative to produce corresponding recompressed video information 134 by recompressing the decompressed video information 146 using a second and different method of compression than that used by compressor 118. The recompressed video information 134 is then wirelessly sent to the destination portable wireless device 104 as recompressed video information 134 via transceiver 108. As such, the transcoding unit 106 receives compressed video information 126 that is compressed using a first method of compression which, for example, may be a method that employs a high compression ratio, and decompresses the compressed video information to produce uncompressed video information. The uncompressed video information is then recompressed via transcoder 143 using a different method of compression, that in this example, provides a lower compression ratio than that provided by compressor 118 to produce recompressed video information 134.

The communication system 100 allows a portable wireless device 102 to use a high compression ratio compressor 118 to highly compress video information to reduce communication bandwidth and storage requirements for the source portable wireless device 102 and allows the use of a destination portable wireless device 104 which has a decompressor 132 that is only capable of, for example, decompressing video information that has been compressed using a lower compression ratio than that of compressor 118. For example, the source portable wireless device 102 can send, for example, a captured photograph in one compression format for a destination portable wireless device that uses a different decompression format. The transcoding unit 106 then enables compatibility with receiving cell phones, or other devices, by sending images in an expected and, for example, standard encoding format for the destination wireless device 104. Other advantages will be recognized by those of ordinary skill in the art.

The compressor, decompressor, and transcoder of the system shown, for example, in FIG. 1 may be implemented using any suitable structure including, but not limited to, discrete logic, suitably programmed processors that execute instructions that are stored in memory to cause the processors to carry out the operations described herein, state machines, or any other suitable combination of hardware, software and firmware.

Figure 2:
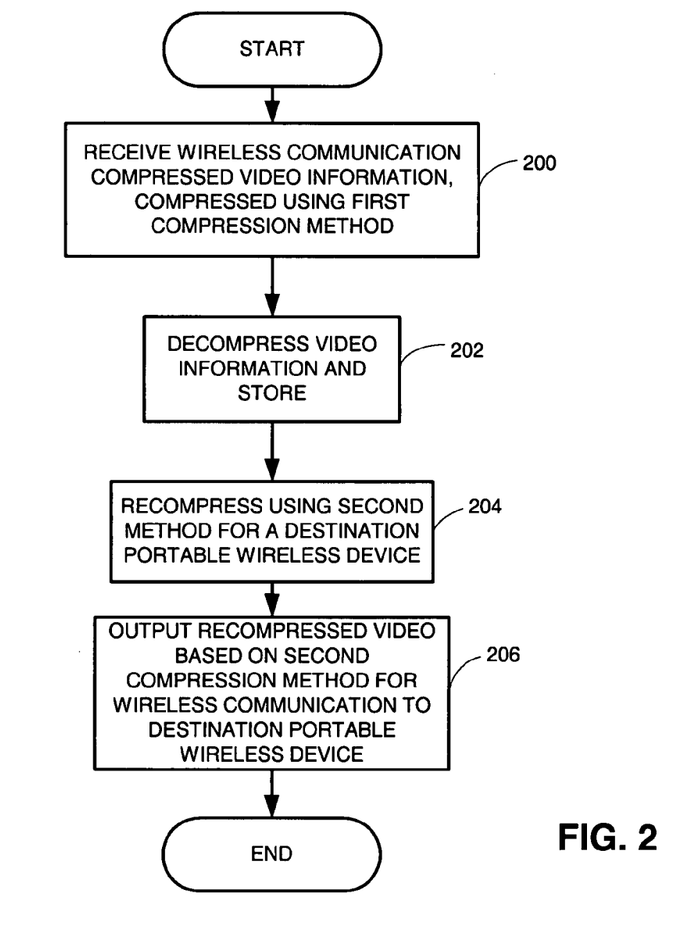
FIG. 2 is a flowchart illustrating one example of a method for communicating compressed video information for a destination portable wireless apparatus in accordance with one embodiment of the invention.

FIG. 2 illustrates one example of a method for communicating compressed information where, for example, the method may be carried out by transcoding unit 106 or any other suitable structure or combination of suitable structures.

As shown in block 200, the method includes receiving wirelessly communicated compressed video information 126 that is compressed using a first method of compression that results in a first compression ratio for the video information. As shown in block 202, the method includes decompressing the received compressed video information using a decompression method corresponding to the first method of compression and storing the resulting uncompressed video information. As shown in block 204, the method includes recompressing the uncompressed video information that was stored for a destination portable wireless device using a second method of compression having a lower compression ratio than that resulting from using the first method of compression. The method then includes, as shown in block 206, outputting the recompressed video information 134 for communication to a destination device. As shown, steps 202 and 204 may be considered transcoding the compressed video information to produce corresponding recompressed video information that is based on a second compression method.

Figure 3:
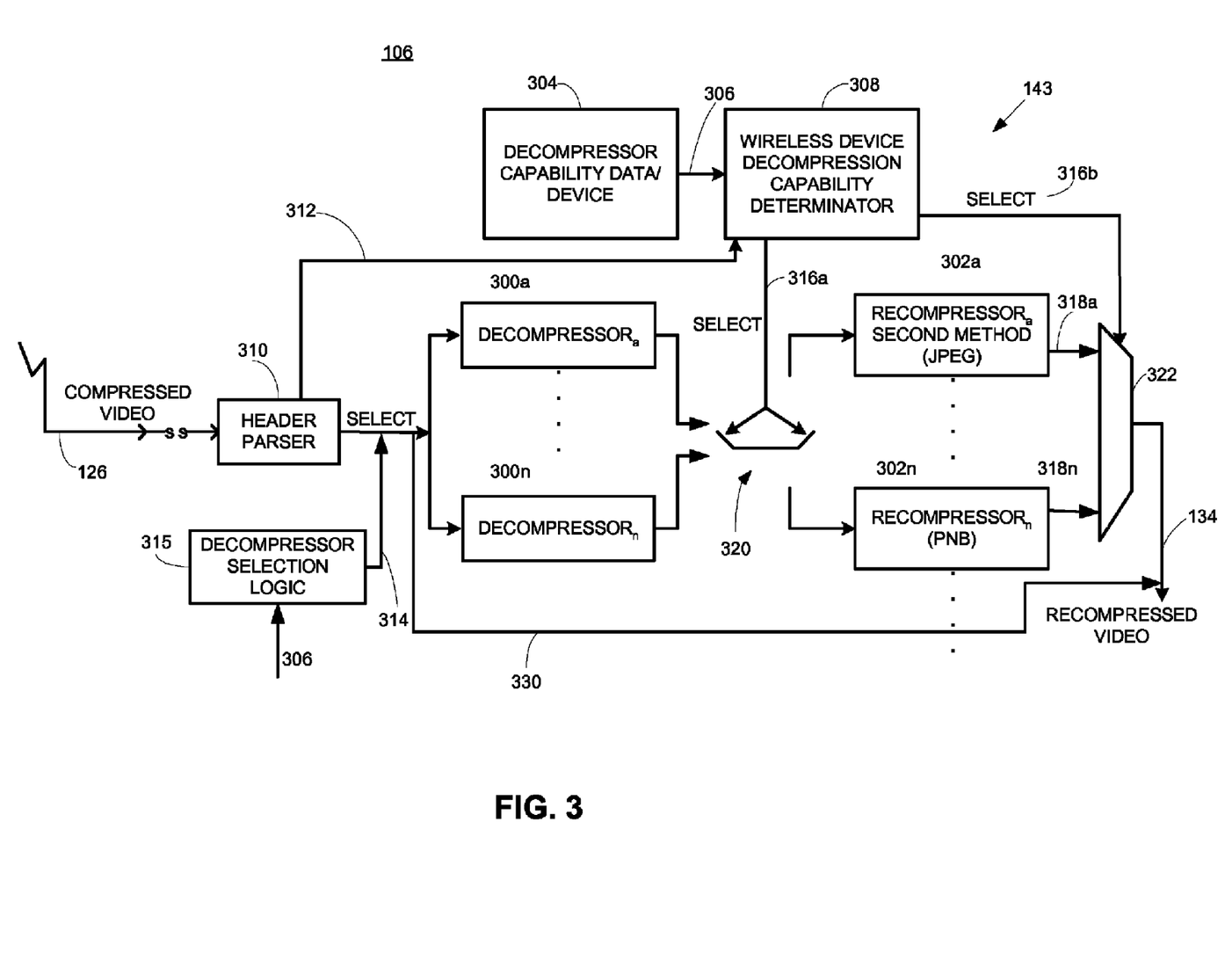
FIG. 3 is a block diagram illustrating one example of a transcoding unit in accordance with one embodiment of the invention.

FIG. 3 is a block diagram illustrating one example of a transcoding unit 106. The transcoding unit 106 in this embodiment, also determines decompression capability of a destination device to determine which of a plurality of different recompression methods should be used for recompression of the video information so that the recompressed video information 134 that is sent to a particular destination device can be suitably decompressed by that destination device. In addition, in this embodiment, the transcoding unit 106 also selectively chooses among a plurality of different decompressors (i.e. that comport different decompressing algorithms) in order to accommodate different compressors 118 from different source portable wireless devices that may use different first compression methods. As such, the transcoding unit may include a plurality of decompressors 300a-300n and a plurality of recompressors 302a-302n as well as memory 304 that contains decompressor capability data for one or more destination devices.

The decompressor capability data 306 may be stored, for example, in memory in a lookup table or database or in any other suitable form, either locally or non-locally such as accessible through a web server and may be data on a per-device basis, per-user group basis or on any other suitable basis. For example, the decompressor compatibility data 306 may indicate, for example, that a given destination portable wireless device 104 has the capability to decompress using only certain of a different number (or in only one) decompression methods. This data may be stored, for example, when the destination portable wireless device registers with the system 100, may be downloaded via the Internet, may be included as part of the message containing the compressed information for the transcoding unit, may be queried from the destination devices or may be provided through any other suitable mechanism.

The transcoding unit 106 also includes logic 308 (e.g. a suitably programmed processor) operative to determine decompression capability of the destination portable wireless apparatus 104 based on the decompressor capability data 306. For example, when a sender sends the compressed video information (e.g. file, or file with a message) for a given destination unit, such as in an email, a packet header parser 310 may evaluate the packet to determine not only the decompression methods needed and hence decompressor 300a-300n to use to decompress the received compressed video 126, but may also determine destination portable wireless device identification information (such as a "from" field in an email, phone number or any other information) so that the appropriate decompressor compatibility data 306 may be evaluated. As such, destination portable wireless device identification information 312 may be used by the logic 308. In addition, decompressor selection logic 315 (e.g. a suitably programmed processor) also controls the selection through a suitable control command 314 to select the appropriate decompressor 300a-300n. Similarly, the logic 308 may generate suitable control information 316a and 316b to determine the appropriate recompressor 302a-302n to use when recompressing the decompressed information for a given destination portable wireless device or group of devices. As shown, control information 316a may be used to control suitable switching logic 320 to allow the appropriate decompressed information to be recompressed by an appropriate recompressor. The transcoder 143 in this particular example, transcodes received compressed video information that has been compressed using the first compression method, based on the determined compression capability of the destination wireless device and produces corresponding recompressed video information that is based on a second compression method using one of the recompressors 302a-302n. Hence, the decompressor selection logic 315 selects the appropriate decompressor 300a-300n based on the parsed information indicating the type of compressed information that was received so that the corresponding decompressor may be used to decompress the compressed information. The logic 308 selects the recompressor method based on the determined decompression capability data as previously noted.

By way of example, control information 316b may control, for example, multiplexing logic 322 to select recompressed video information 318a-318n for output as the recompressed video 134 to the appropriate destination portable wireless device. In this example, the compressed video 126 has been compressed using a compression method that has a higher compression ratio than the corresponding recompression method used by recompressors 302a-302n. This higher compression ratio method may be a proprietary method that has not been adopted as an industry standard method. As shown, recompressors 302a and 302n may, for example, recompress the decompressed information into standard compressed files such as JPEG, PMB, JPEG 2000 or other industry standard compression methods. Decompressed video 126, on the other hand, may be compressed using a higher compression ratio and a less lossy compression method, if desired.

In this example, the logic 308 is operative to determine the decompression capability of the destination portable wireless apparatus by, for example, accessing destination portable wireless apparatus decompression capability data in memory 304 wherein the decompression capability data represents those decompression methods a particular destination portable wireless apparatus or group of wireless apparatus may accommodate. Alternatively, as noted above, the decompression capability data may be sent, for example, by either the sending device or may be sent by the destination wireless apparatus either through known querying methods, for example, the transcoding unit querying the destination wireless device or as part of the compressed video 126 (in the case of the sending wireless portable apparatus providing the decompression capability data). Any other suitable way of providing the decompression capability data through a transcoding unit may also be used.

In addition, if desired, the decompression selection logic 315 may also be operative to bypass the transcoding of the received compressed video information if the portable wireless destination unit also utilizes the corresponding decompression method used to generate the compressed video information 126. This path is shown as path 330. This may be based on, for example, the decompressor capability data 306.

As such, the decompression selection logic 315 may also utilize the decompressor capability data in order to bypass the decompressors and recompressors as desired. As such, if the decompression capability of the destination wireless portable apparatus matches that of an apparatus that sent the received compressed video information 126, the transcoding unit bypasses the transcoding operation.

Figure 4:
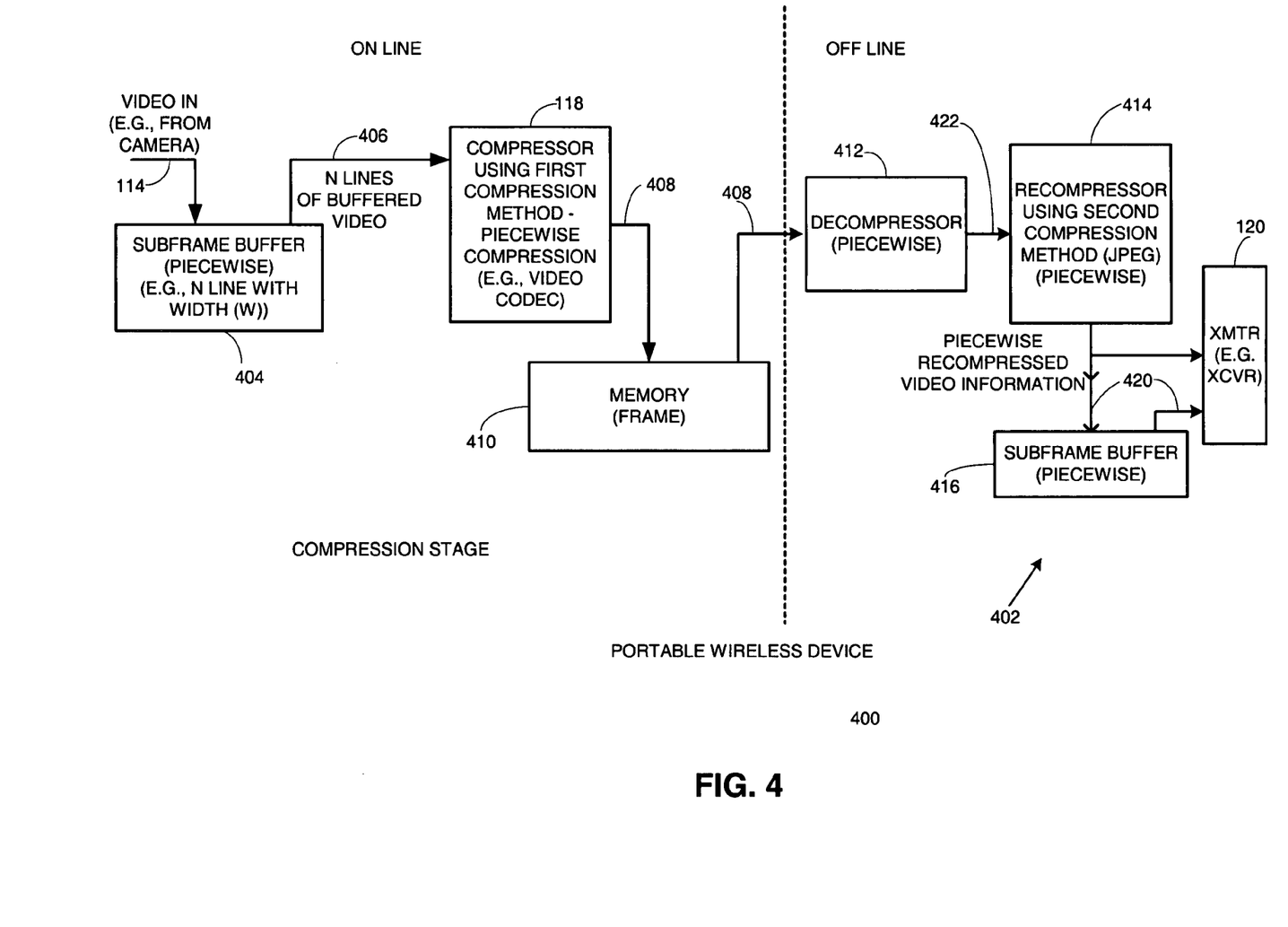
FIG. 4 is a block diagram illustrating one example of a portable wireless apparatus in accordance with one embodiment of the invention.

FIG. 4 illustrates another example of a portable wireless device 400 that, in this embodiment, employs transcoding operations as opposed to a network element employing the transcoding operation. The portable wireless apparatus 400 also includes a transcoder 402 so that the portable wireless device may provide suitable transcoding as opposed to, or in addition to, a different transcoding unit. In this example, the portable wireless device 400 receives input video information 114 from a suitable source, such as an onboard camera or other video capture device and temporarily stores the input video information 114 in a subframe buffer 404. The subframe buffer 404 stores only a portion of an entire frame of video and may be, for example, a multiple line buffer with a given width so that it stores a predetermined number of lines of input video temporarily (e.g. such as 16 lines of video at a time). As such, storage of the input video information is done on a subframe basis, as opposed to, for example, on a full frame storage basis. The compressor 118 then receives N lines of buffered video 406 from the subframe buffer 404 and compresses, on a piecewise basis, the retrieved N lines of buffered video 406 using a compression method that provides a higher compression ratio than the compression method used by the recompressor as later described. For example, piecewise compression includes compressing information on a block by block basis, line by line basis or other suitable piecewise basis. The compressor 118 stores the compressed portion of video 408 in memory 410 which may be a memory sized to store an entire frame or a full frame of piecewise compressed input video information 114. The high compressed data buffer 410 stores a full frame of compressed video, but it is smaller than standard sized frame buffers. Then subframe buffer is used to decompress the compressed video piece by piece and re-encode the decompressed video using, for example, a standard compression format (but there is not enough storage for a full standard encoded frame in the subframe buffer so a piece of the compressed video is decoded, re-encoded, sent and then the transcoding process is repeated when the subframe buffer memory is available for transcoding a new piece of compressed video from the full frame buffer 410 (but compressed frame).

The portable wireless device employs transcoder 402 and in this example includes a decompressor 412, a recompressor 414 and another subframe buffer 416. However, it will be recognized that any suitable device or devices may be employed as the transcoder 402 as long as the transcoder produces corresponding recompressed video information that is based on a second compression method which is different (e.g. a lower compression ratio) from that of the compression method used by compressor 118 for the corresponding compressed video information 408.

As shown, the piecewise compression of input video information may be performed online related to the camera. The transcoding may be performed offline (e.g., when the video capture device is no longer capturing video) and produces recompressed video information 420 that is recompressed using a second compression method and in this example is recompressed on a piecewise basis using a standard compression method such as JPEG. Piecewise recompression may be done on a block by block, line(s) basis or any other suitable piecewise basis. The recompressed video information 420 may then be sent via a transmitter 120 or stored in a subframe buffer 416 which stores the piecewise recompressed video information for later transmission during a suitable time period. A suitable time period may be, for example, during a non-peak time period of the system 100 or during a current time period while the portable wireless device 400 is performing some other operation.

The decompressor 412 retrieves the compressed video information 408 that is compressed on a piecewise basis and decompresses the retrieved compressed video information from memory 410 also on a piecewise basis (e.g. multiple line basis or block basis). The decompressor 412 produces uncompressed video 422 which is then recompressed by the recompressor 414 on a piecewise basis using a different compression method than the compression method used by compressor 118. The wireless transmitter 120 wirelessly sends the piecewise recompressed video information 420 for the destination portable wireless device 104 either directly to the device or through some other component or interface or network, as desired. It will be recognized that the wireless transmitter 120 may be any suitable wireless transmitter including, but not limited to, an infrared wireless transmitter, cellular frequency transmitter, wireless local area network transmitter, wireless wide area network transmitter or any other suitable wireless transmitter depending upon the type of wireless portable device and the desired application.

By way of example, the compressor 118 may use, for example, any suitable compression method. For example, a compression method that may be useful may be a sub-band compression method which is line oriented which takes, for example, a line of a given video image and compresses it based on the line basis or sub-line basis as opposed to a block by block basis. One suitable compression technique may be that as described, for example, in PCT Application No. WO2004028142, filed Sep. 5, 2003 having inventors Ceperkovic et al. and entitled "FAST CODEC WITH HIGH COMPRESSION RATIO AND MINIMUM REQUIREMENT REQUIRED RESOURCES" incorporated herein by reference in its entirety which describes, for example, single pass and multipass synchronized encoders and decoders that employ direct and inverse non-stationary filters for recursive octave direct and inverse sub-band transformation (pyramidal decomposition) and other aspects as described in the reference, for example, on pages 9-51. However, it will be recognized that any suitable compression method or methods may be employed. As noted, as described herein, the compression method used by compressor 118 is a method that provides a higher compression ratio than the recompression method employed in the transcoding process. It will be recognized that any suitable compression methods may be employed but it is preferable that the first method of compression be a higher compression ratio than the method of compression used during transcoding.

As noted above, with respect to FIG. 4, after an image is stored with high compression quality on a piecewise basis (e.g. slice by slice—e.g. 16 lines), the portable wireless device 400 manipulates the resulting information using suitable graphics processing circuits as known in the art to apply different effects. The device 400 may then encode the resulting video information into a target compression level by the transcoder. The video effect processing is not shown in FIG. 4 but is described with respect to FIGS. 7 and 8.

In this particular example, the memory 410 includes an entire frame of compressed video wherein the transcoder 402 decompresses, on a piecewise basis, portions of the compressed video information by decompressing on a piecewise basis, the compressed video in memory 410 to produce decompressed portions of video 422. The recompressor 414 recompresses, on a piecewise basis, the decompressed portions of video 422 using the second compression method wherein the second compression method provides a lower compression ratio than the first compression method used to compress the video information stored in the memory 410. The recompressor 414 stores the recompressed video information, in one example, in subframe buffer 416 for sending for the destination portable wireless apparatus 104 through the transmitter 120. The transmitter 120 is controlled to send, on a piecewise basis, portions of the recompressed video information for the destination portable wireless apparatus 104 until, for example, the entire frame is sent. As such, smaller buffers may be utilized while accommodating differing compression standards that are employed by differing destination units. The subframe buffers 404 and 416 may be part of a common memory array but different address spaces within the array or may be separate memory arrays as desired and that the memory 410 may also be part of the same memory array of the subframe buffers but may be separate memory array.

Figure 5:
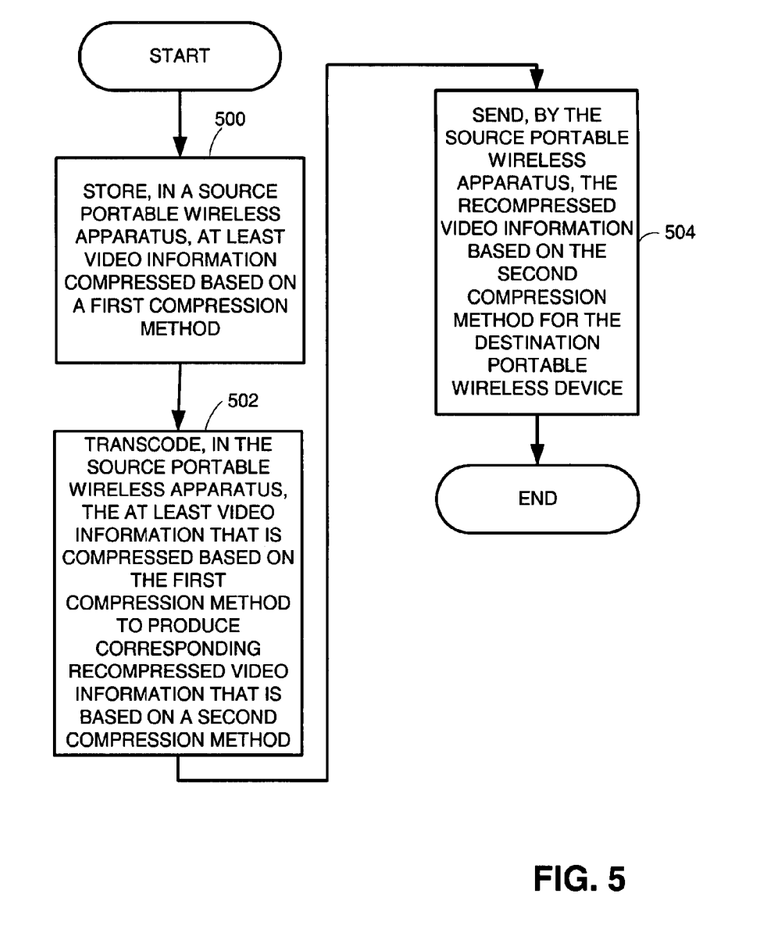
FIG. 5 is a flowchart illustrating one example of a method for communicating compressed video information in accordance with one embodiment of the invention.

FIG. 5 illustrates one example of a method for communicating compressed video information for a destination portable wireless device that may be carried out, for example, by the portable wireless device of FIG. 4, or any other suitable device. As shown in block 500, the method includes storing, in the source portable wireless device, video information or any other information, compressed based on a first compression method. As shown in block 502, the method includes transcoding, in the source portable wireless apparatus, the video information that is compressed based on the first compression method to produce corresponding recompressed video information that is based on the second compression method. This may be carried out, for example, by the transcoder 402 or any other suitable structure. As shown in block 504, the method includes sending, such as through the transmitter 120, the recompressed video information that is recompressed based on a second compression method, for the destination portable wireless device 104. It will be recognized that although certain processes are described in a certain order by way of example, that the processes described herein may be carried out in any suitable order.

Figure 6:
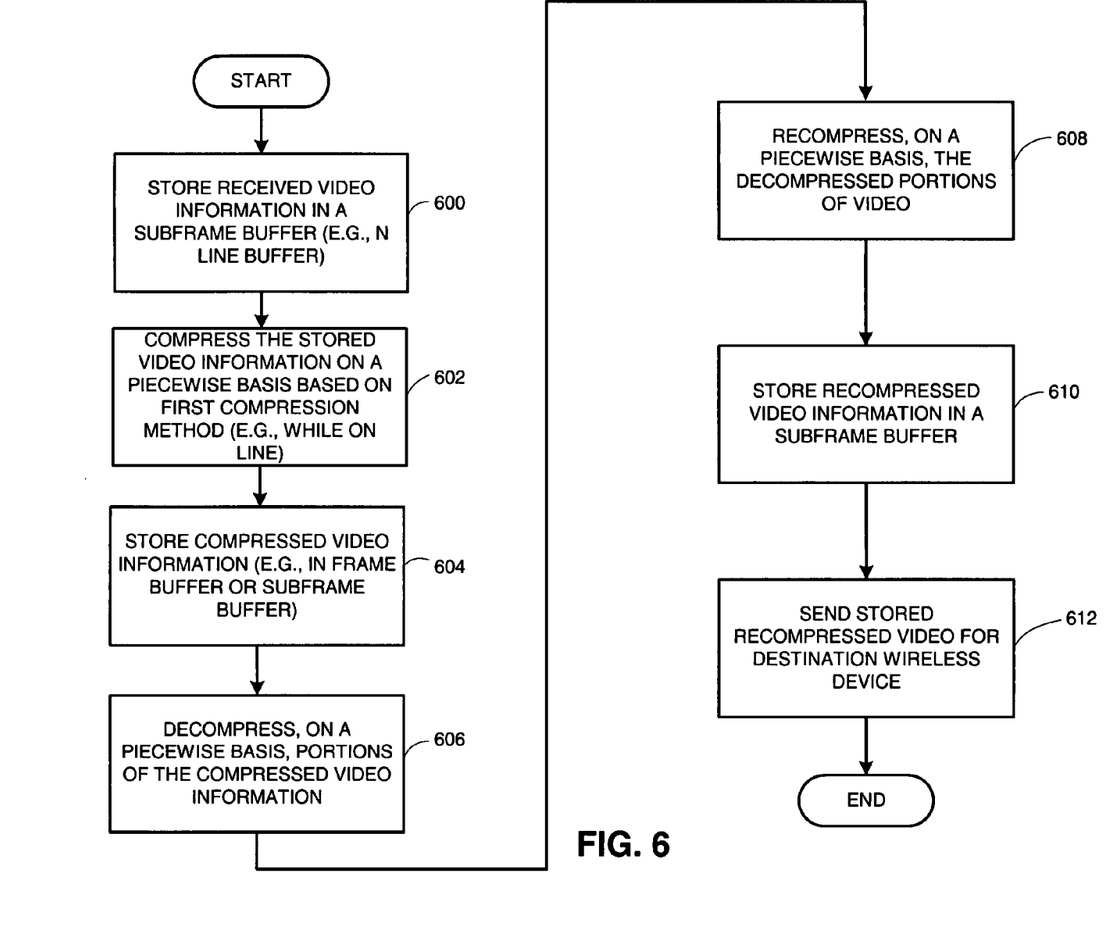
FIG. 6 is a flowchart illustrating one example of a method for communicating compressed video information in accordance with one embodiment of the invention.

FIG. 6 illustrates in more detail, one example of a method for communicating compressed video information for a destination portable wireless device which is carried out, for example, by the device of FIG. 4 or any other suitable device. As shown in block 600, the method includes storing received video information in a subframe buffer, such as subframe buffer 404. As shown in block 602, the method includes compressing the stored video information that is stored in the subframe buffer, on a piecewise basis, based on a first compression method, while online. As shown in block 604, the method includes storing the compressed video information that was compressed on a piecewise basis, in memory which may be, for example, a frame buffer. As shown in block 606, the method includes decompressing, on a piecewise basis, portions of the compressed video information while offline. As shown in block 608, the method includes recompressing, on a piecewise basis, the decompressed portions of video and storing recompressed video information in a subframe buffer, such as subframe buffer 416, as shown in block 610. As shown in block 612, the method includes sending the stored recompressed video information stored in the subframe buffer for a destination wireless device.

Figure 7:
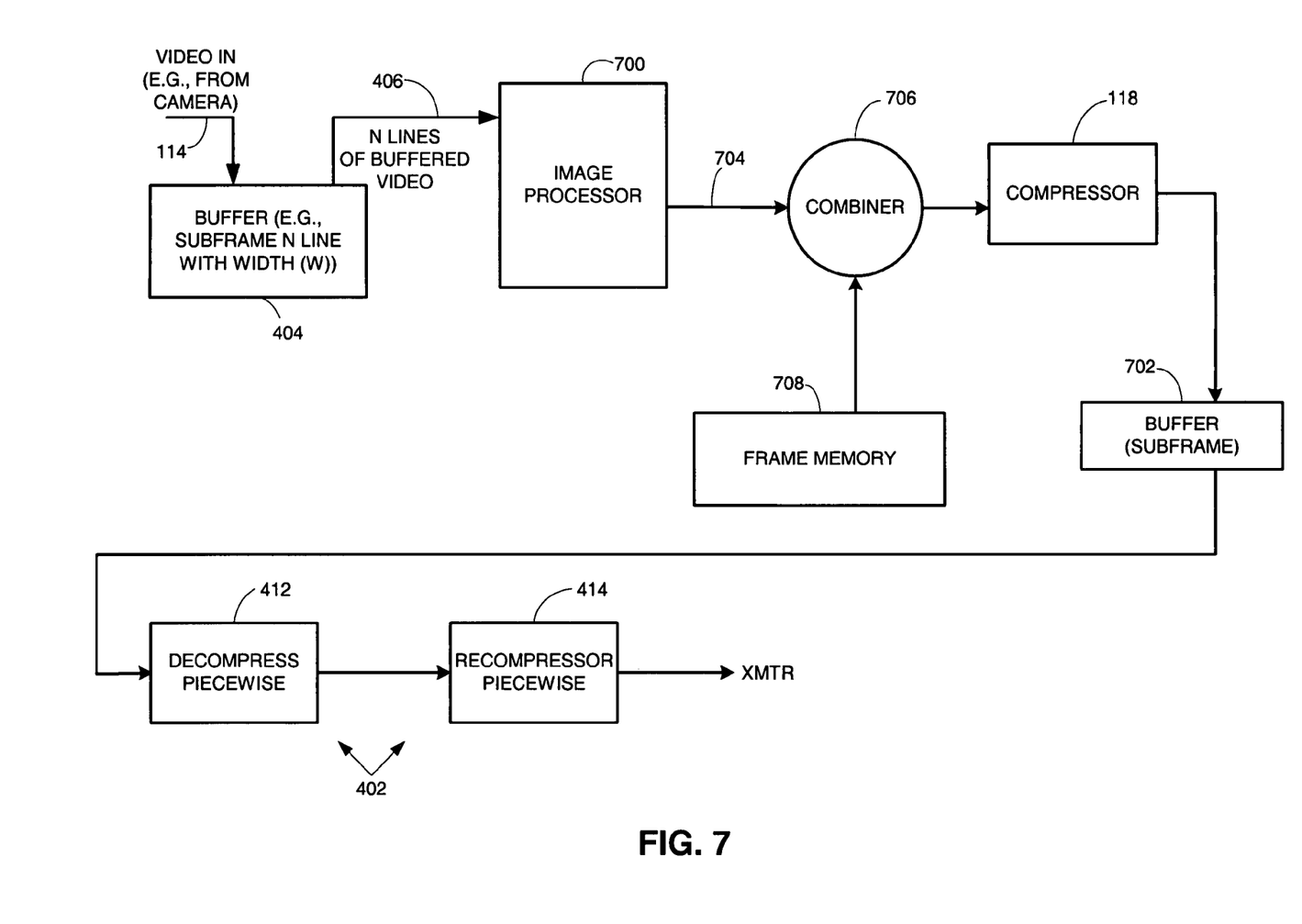
FIG. 7 is a block diagram illustrating one example of a portable wireless apparatus in accordance with one embodiment of the invention.

FIG. 7 illustrates another example, in block diagram form, of a portable wireless apparatus similar to that described in FIG. 4 but which shows an image processor 700, as known in the art, which allows the device or a user of the portable device, through suitable graphic user interfaces or other software applications, to process the input video information 114 to, for example, add desired visual effects or audible effects or to provide filtering such as noise reduction through a suitable anti-aliasing techniques or other suitable noise and filtering techniques, as known in the art.

In this example, the image processor 700 is operative to process input video information 114, to provide noise reduction and add effects to the video information, prior to compression using the first method of compression by compressor 118. As shown, the image processor 700 outputs, for example, filtered video information 704 to combining logic 706. The combining logic 706 combines the portions of the incoming video with other video information such as a frame border, image notes (like time stamps, small images) stored in frame memory, or frame information from a previous frame from frame memory 708. The combined video information may be, for example, overlaid information that is then passed to the compressor 118 which compresses the information on a piecewise basis and stores the compressed information in subframe buffer 702. The compressed information is then transcoded on a piecewise basis and sent for the destination portable wireless device as previously described.

Figure 8:
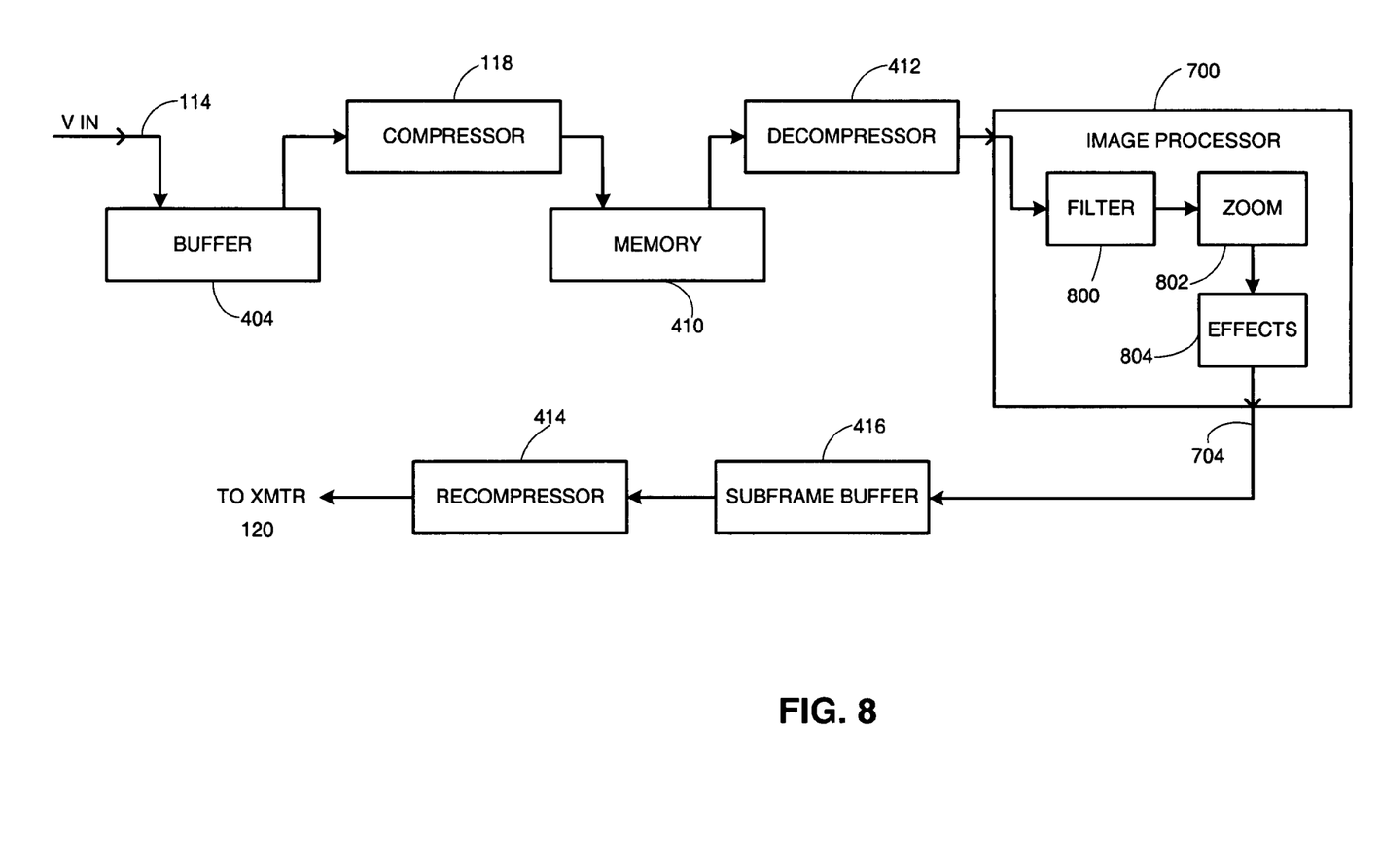
FIG. 8 is a block diagram illustrating another example of a portable wireless apparatus in accordance with one embodiment of the invention.

FIG. 8 illustrates an alternative embodiment for a portable wireless device in accordance with one embodiment of the invention wherein the image processor 700 processes images that have already been compressed and then decompressed as part of the transcoding process. The image processor 700 may be included in the transcoder. As shown, the image processor 700, as known in the art, may include suitable filtering using any suitable filter 800, may provide zoom effects using suitable zoom processing operations 802 as known in the art and any other overlay effects or any other suitable effects through known effect to generation techniques as indicated by block 804. As such, this illustration shows a different portion within the video processing path in which to utilize an image processor 700. Other variations will be recognized by those of ordinary skill in the art.

As also noted above, the portable wireless device may provide offline transcoding (e.g., with respect to a video capture operation) and a method of communication may include storing in the source portable wireless apparatus video, information compressed in a first compression method and transcoding while offline, in the source portable wireless apparatus, the video information that is compressed based on the first compression method to produce on a piecewise basis, corresponding recompressed video information that is based on a second compression method. This information may then be wirelessly sent to the destination portable wireless device or a network element as desired.

As set forth above, a method for communicating wireless video information may include, for example, receiving, via a wireless communication, at least video information compressed based on at least one of a plurality of different compression methods and determining which of the different compression methods the received video information was compressed with. This may be done, for example, by the network element shown, for example, in FIG. 1. However, any suitable structure may also carry out this operation. In addition, the method includes selecting one of a plurality of decompression methods to decompress the received video information.

Based on the above description, apparatus and methods may, among other things, allow for a high compression ratio compression method to be used by a device to reduce the amount of memory required in the portable device while also allowing a destination device that uses a different compression method to display the video information compressed by the sending unit. The destination or target device uses, for example, a lower compression ratio methodology but can receive video information originally compressed in a high compression ratio. Although a source portable wireless device may use a stronger compression scheme, the destination wireless devices may employ, for example, JPEG or JPEG 2000 or other standard decompression techniques. Other advantages will be recognized by those of ordinary skill in the art.

The above detailed description of the present examples has been presented for the purposes of illustration and description only and not by limitation. It is therefore contemplated that the present application cover any additional modifications, variations, or equivalents but fall within the spirit and scope of the basic underlying principles disclosed above and the appended claims.

What is claimed:

1. A method for communicating at least compressed video information for a destination apparatus comprising:
    storing, in a source portable wireless apparatus, at least video information compressed based on a first compression method;
    transcoding, in the source portable wireless apparatus, the at least video information that is compressed based on the first compression method to produce corresponding recompressed video information that is based on a second compression method; and
    sending, by the source portable wireless apparatus, the recompressed video information based on the second compression method for the destination apparatus,
    wherein storing at least video information based on a first compressed method comprises storing an entire frame of compressed video;
    wherein transcoding the at least video information that is compressed based on the first compression method comprises:
        decompressing, on a piecewise basis, portions of the compressed video information to produce decompressed portions of video,
        recompressing, on a piecewise basis, the decompressed portions of video using the second compression method wherein the second compression method provides a lower compression ratio than the first compression method; and
        storing the recompressed video information for sending by the source portable wireless apparatus, and
    wherein sending, by the source portable wireless apparatus, the recompressed video information based on the second compression method for the destination portable wireless device comprises sending, on a piecewise basis, portions of the recompressed video information for the destination apparatus.

2. A method for communicating at least compressed video information for a destination apparatus comprising:
    storing received video information in a sub frame buffer;
    compressing the stored video information from the sub frame buffer on a piecewise basis using a first method of compression;
    storing, in a source portable wireless apparatus, the compressed video information; and
    transcoding, in the source portable wireless apparatus, the at least video information that is compressed based on the first compression method to produce corresponding recompressed video information that is based on a second compression method.

3. The method of claim 2 further comprising sending, by the source portable wireless apparatus, the recompressed video information based on the second compression method for the destination apparatus and wherein the second compression method provides a lower compression ratio than the first compression method.

4. The method of claim 2 wherein transcoding comprises, processing decompressed video information to at least one of: provide noise reduction and add effects to the video information, prior to recompression using the second method of compression.

5. The method of claim 2 comprising sending the recompressed video information to a destination apparatus on behalf of the sending portable wireless apparatus.

6. The method of claim 2 comprising processing video information to at least one of: provide noise reduction and add effects to the video information, prior to compression using the first method of compression.

7. A method for communicating at least compressed video information comprising:
    receiving compressed video information compressed based on a first compression method from a sending portable wireless apparatus;
    determining decompression capability of a destination apparatus;
    based on the determined compression capability of the destination apparatus, transcoding the received compressed video information compressed based on the first compression method to produce corresponding recompressed video information that is based on a second compression method; and
    in response to receiving the video information, determining, from a plurality of different type of decompression methods, a decompression method to use on the received compressed video information based on the received compressed video information and selecting one of a plurality of recompression methods based on the determined decompression capability of the destination wireless portable apparatus.

8. The method of claim 7 comprising bypassing transcoding of the received compressed video information compressed based on a first compression method to produce corresponding recompressed video information that is based on a second compression method if a decompression capability of the destination wireless portable apparatus matches that of an apparatus that sent the received compressed video information.

9. The method of claim 7 wherein the first compression method provides a higher compression ratio than the second compression method and wherein the method comprises sending the recompressed video information based on the second compression method for the destination portable wireless device.

10. The method of claim 7 wherein the first compression method is a proprietary compression method to the sending portable wireless apparatus and provides a higher compression ratio than the second compression method and wherein the second compression method is an adopted industry standard compression method.

11. A method for communicating wireless video information comprising:
    receiving, via a wireless communication, at least video information compressed based on at least one of a plurality of different compression methods;
    determining, in response to receiving the video information, which of the different compression methods the received video information was compressed with;

selecting at least one of a plurality of decompression methods to decompress the received video information; and producing corresponding uncompressed video information using the selected decompression method.

12. A portable wireless apparatus for communicating at least compressed video information comprising:
   memory containing at least video information compressed based on a first compression method;
   a transcoder, operatively coupled to the memory, and operative to produce corresponding recompressed video information that is based on a second compression method, from the at least video information that is compressed based on the first compression method;
   a wireless transmitter, operatively coupled to the transcoder, and operative to wirelessly send the recompressed video information based on the second compression method; and
   an image processor operative to process decompressed video information to at least one of:
   provide noise reduction and add effects to the video information, prior to recompression using the second method of compression.

13. A portable wireless apparatus for communicating at least compressed video information comprising:
   memory containing at least video information compressed based on a first compression method;
   a transcoder, operatively coupled to the memory, and operative to produce corresponding recompressed video information that is based on a second compression method, from the at least video information that is compressed based on the first compression method; and
   a wireless transmitter, operatively coupled to the transcoder, and operative to wirelessly send the recompressed video information based on the second compression method;
   wherein the memory stores an entire frame of compressed video;
   wherein the transcoder is operative to:
      decompress, on a piecewise basis, portions of the compressed video information to produce decompressed portions of video,
      recompress, on a piecewise basis, the decompressed portions of video using the second compression method wherein the second compression method provides a lower compression ratio than the first compression method; and
      store the recompressed video information for sending for a destination device, and
   wherein the wireless transmitter is operative to wirelessly send, on a piecewise basis, portions of the recompressed video information for the destination device.

14. The portable wireless apparatus of claim 13 wherein the second compression method provides a lower compression ratio than the first compression method.

15. The portable wireless apparatus of claim 13 including an image processor operative to process video information to at least one of: provide noise reduction and add effects to the video information, prior to compression using the first method of compression.

16. An apparatus for communicating at least compressed video information for a destination portable wireless apparatus comprising:
   logic operative to determine decompression capability of the destination portable wireless apparatus;
   a transcoder operative to transcode a received compressed video information compressed based on a first compression method, based on the determined compression capability of the destination wireless device, to produce corresponding recompressed video information that is based on a second compression method; and
   a plurality of different types of decompressors, and logic operative to determine, in response to receiving the compressed video information, which of the plurality of different types of decompressors to use on the received compressed video information based on the received compressed video information and selecting one of a plurality of recompression methods based on the determined decompression capability of the destination wireless portable apparatus.

17. The apparatus of claim 16 comprising logic operative to bypass transcoding of the received compressed video information compressed based on a first compression method to produce corresponding recompressed video information that is based on a second compression method if a decompression capability of the destination wireless portable apparatus matches that of an apparatus that sent the received compressed video information.

18. The apparatus of claim 16 wherein the first compression method provides a higher compression ratio than the second compression method and wherein the method comprises sending the recompressed video information based on the second compression method for the destination portable wireless device.

19. A portable wireless apparatus for communicating at least compressed video information for a destination apparatus comprising:
   a frame buffer containing a frame of video information compressed, on a piecewise basis based on a first compression method;
   a transcoder, operatively coupled to the frame buffer, and operative to produce corresponding piecewise recompressed video information, on a piecewise basis, that is based on a second compression method, from the at least video information that is compressed based on the first compression method;
   a sub frame buffer, operatively coupled to the transcoder, that stores the corresponding piecewise recompressed video information, wherein the piecewise recompressed video information includes a portion less than the frame; and
   a wireless transmitter, operatively coupled to the sub frame buffer, and operative to wirelessly send the recompressed video information based on the second compression method for a destination portable wireless device.

20. A method for communicating at least compressed video information for a destination apparatus comprising:
   storing, in a frame buffer, a frame of at least video information compressed based on a first compression method;
   transcoding, on a piecewise basis, the at least video information that is compressed based on the first compression method to produce corresponding piecewise recompressed video information that is based on a second compression method; and
   storing, in a sub frame buffer, the piecewise recompressed video information, wherein the piecewise recompressed video information includes a portion less than the frame.

* * * * *